United States Patent
Anklovitch

(10) Patent No.: US 10,754,044 B2
(45) Date of Patent: Aug. 25, 2020

(54) GLOBAL NAVIGATION SATELLITE SYSTEM (GNSS) ANTENNA DATA LINK

(71) Applicant: NovAtel Inc., Calgary (CA)

(72) Inventor: Darrell James Anklovitch, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 247 days.

(21) Appl. No.: 15/961,263

(22) Filed: Apr. 24, 2018

(65) Prior Publication Data

US 2019/0324152 A1    Oct. 24, 2019

(51) Int. Cl.
*G01S 19/36*    (2010.01)
*G01S 19/47*    (2010.01)

(52) U.S. Cl.
CPC .............. *G01S 19/36* (2013.01); *G01S 19/47* (2013.01)

(58) Field of Classification Search
CPC .......... G01S 19/36; G01S 19/47; G01S 19/49; G01S 19/20; G01C 21/165; G01C 21/28
USPC ....................................................... 342/357.3
See application file for complete search history.

(56) References Cited

U.S. PATENT DOCUMENTS

| | | | |
|---|---|---|---|
| 6,721,657 B2 | 4/2004 | Ford et al. | |
| 6,750,816 B1 | 6/2004 | Kunysz | |
| 7,268,727 B2 | 9/2007 | Montgomery et al. | |
| 7,671,791 B2 | 3/2010 | Feller | |
| 7,804,887 B2 | 9/2010 | Page | |
| 8,547,276 B2 | 10/2013 | Cole et al. | |
| 10,088,576 B2 | 10/2018 | Vasilyuk et al. | |
| 2002/0169578 A1 | 11/2002 | Yang | |
| 2004/0236509 A1 | 11/2004 | Jeerage | |
| 2005/0242991 A1* | 11/2005 | Montgomery | G01S 19/15 342/357.36 |

FOREIGN PATENT DOCUMENTS

WO    2017188836    11/2017

OTHER PUBLICATIONS

European Search Report dated Sep. 19, 2019 for EP Application No. 19170962.5 for NovAtel, Inc., 11 pages.

* cited by examiner

*Primary Examiner* — Harry K Liu
(74) *Attorney, Agent, or Firm* — Cesari and McKenna, LLP

(57) ABSTRACT

An antenna enclosure includes a sensor and a Global Navigation Satellite System (GNSS) antenna. Within the antenna enclosure, sensor data is combined with GNSS information to produce a RF communication signal, wherein the sensor data is out-of-band from the GNSS information. The RF communication signal is transmitted utilizing a GNSS antenna data link to a receiver side. On the receiver side, the RF communication signal is split into a GNSS RF path and a sensor RF path. The GNSS signals are transmitted to the GNSS receiver via the GNSS RF path. A sensor RF communication signal is de-modulated, and the sensor data is transmitted to the GNSS receiver. When the GNSS antenna data link is bi-directional, information may be transmitted from the GNSS receiver to the antenna enclosure via the GNSS antenna data link.

16 Claims, 7 Drawing Sheets

GLOBAL NAVIGATION SATELLITE SYSTEM (GNSS) ANTENNA DATA LINK

BACKGROUND

Technical Field

The invention relates generally to Global Navigation Satellite System (GNSS) systems, and more particularly, to a GNSS antenna data link that transmits sensor data and GNSS information from an antenna enclosure to a GNSS receiver.

Background Information

Global navigation satellite system (GNSS) and inertial navigation system (INS) integration is used for certain navigation and remote sensing applications that utilize position, velocity, and/or orientation information. The INS combines sensor data from sensors that make up an inertial measurement unit (IMU) with GNSS information from GNSS signals received at the GNSS receiver to compute position, velocity, and/or attitude. A 3-dimensional vector between the GNSS antenna and the IMU is known as a "lever arm," and the lengths of the vector in the x, y, and z dimensions are referred to as "lever arm values." Accurate lever arm values are crucial such that the INS can correctly integrate the sensor data and the GNSS information to produce accurate position, velocity, and/or attitude.

With prior art systems, the IMU is typically mounted at a location in close proximity to the GNSS receiver while the GNSS antenna is typically mounted at a location where there is a clear view of the sky such that the GNSS signals are readily received. For example, the GNSS antenna is typically mounted on the outside of a vehicle, such as on the roof of a car or an exterior of a ship, while the IMU is typically mounted in close proximity to the GNSS receiver that is located inside of the vehicle.

With the prior art systems, the user has to manually determine and enter the lever arm values into the GNSS/INS system. In addition, if the GNSS antenna and/or the IMU are moved to a different location, the lever arm values have to be recalculated by the user and re-entered into the GNSS/INS system by the user. Accordingly, such prior art systems are prone to user error, and if the user incorrectly determines the lever arm values and/or incorrectly enters the lever arm values into the GNSS/INS system, the INS will produce inaccurate position, velocity, and/or attitude.

Further, and as known by those skilled in the art, IMU errors (e.g., angular errors) may result in a loss of accuracy to the sensor data. As such, the loss of accuracy is magnified as the distance between the GNSS antenna and IMU increases, i.e., the lever arm values increase. As such, smaller lever arm values are desired.

Furthermore, the lever arm values may be more susceptible to changes as the distance between the GNSS antenna and IMU increases. Specifically, a GNSS antenna mounted at one end of a ship and an IMU mounted at the other end of the ship may experience different motion due to the sea, for example. In this scenario, the lever arm values may constantly be changing, which in turn would result in the INS producing inaccurate position, velocity and/or attitude. Therefore, reducing the distance between the GNSS antenna and IMU is desirable to ensure that the GNSS antenna and IMU experience the same motion, which in turn increases the likelihood that the lever arm values remain constant.

In addition, certain existing antenna structures do not include IMU capability and/or other sensor capability. If a user wants to update the antenna structure to include the IMU capability and/or the other sensor capability, the user typically needs to add extra cabling, extra communication lines, and/or additional hardware to support the inclusion of the IMU and/or other sensor. Adding such components can be costly to the user.

Thus, what is needed is a system and method that overcomes the above mentioned problems.

SUMMARY

The inventive system and method utilizes a Global Navigation Satellite System (GNSS) antenna data link to transmit sensor data and GNSS information from an antenna enclosure to a GNSS receiver. Specifically, a GNSS antenna within the antenna enclosure receives one or more GNSS signals containing GNSS information from one or more GNSS satellites. In addition, a sensor, e.g., an inertial measurement unit (IMU) sensor, within the antenna enclosure produces sensor data. If the sensor data is in an analog format, an analog-to-digital converter may be utilized to convert the sensor data to a digital format. The sensor data may then be transmitted to an antenna side controller.

A radio frequency (RF) modulator/de-modulator of the antenna side controller may modulate the sensor data onto a RF communication signal to produce a sensor RF communication signal. A combiner combines the sensor RF communication signal containing the sensor data with the GNSS signals containing the GNSS information to produce a single RF communication signal, wherein the sensor RF communication signal is out-of-band from the GNSS signals.

The single RF communication signal is transmitted from the antenna enclosure to the receiver side utilizing the GNSS antenna data link which, for example, may be a single coaxial cable. The GNSS antenna data link may be unidirectional from the antenna enclosure to the receiver side or bi-directional. On the receiver side, a splitter is utilized to split the single RF communication signal into a GNSS RF path and a sensor RF path. A GNSS split RF signal containing the GNSS information is transmitted to the GNSS receiver via the GNSS RF path.

A sensor split RF signal containing the sensor data is transmitted to a receiver side controller via the sensor RF path. A RF modulator/de-modulator of the receiver side controller de-modulates the sensor data from the sensor split RF signal and the sensor data is transmitted to the GNSS receiver utilizing a protocol associated with a communication port at the GNSS receiver. The GNSS receiver may then utilize the GNSS information and the sensor data in a known manner. For example, the GNSS receiver may utilize the GNSS information to compute position and/or an INS filter (e.g., Kalman filter) within the GNSS receiver may utilize the lever arm values, associated with the GNSS antenna and the sensor mounted in the same antenna enclosure, to integrate the sensor data and the GNSS information to produce accurate position, velocity, and/or attitude.

In an embodiment and when the GNSS antenna data link is bi-directional, the GNSS receiver may transmit information (e.g., request information, configuration information, and/or time information) to the antenna enclosure via the sensor RF path. The time information may be utilized, for example, by the antenna side controller to synchronize a sensor clock with GNSS time to accurately time-stamp the sensor data. In addition or alternatively, the request information may be utilized to request particular information from the antenna enclosure and/or the configuration information may be utilized to instruct a device within the antenna enclosure to perform one or more functions.

Advantageously, and since the sensor and the GNSS antenna are within the same antenna enclosure, movement of the antenna enclosure does not cause the lever arm values to change. That is, the lever arm values remain constant since the positional relationship between the GNSS antenna and the sensor within the antenna enclosure remains constant. Thus, the lever arm values associated with the GNSS antenna and the sensor only have to be calculated once. For example, if a manufacturer builds the antenna enclosure that includes the GNSS antenna and the sensor, the lever arm values may be determined once during the manufacturing process and then provided to the GNSS/INS system. As such, a user does not have to calculate and/or repeatedly calculate the lever arm values. In addition, a loss in accuracy of the sensor data, due to IMU errors, is not magnified since the GNSS antenna and sensor are in close proximity to each other within the antenna enclosure.

Moreover, if a user chooses to upgrade an existing antenna structure to include IMU capability and/or other sensor capability, extra cabling, extra communication lines, and/or additional hardware are not required since the IMU capability and/or other sensors can be added to the antenna enclosure and the single GNSS antenna data link can be utilized to transmit the sensor data with the GNSS information to the GNSS receiver.

BRIEF DESCRIPTION OF THE DRAWINGS

The description below refers to the accompanying drawings, of which.

DETAILED DESCRIPTION OF AN ILLUSTRATIVE EMBODIMENT

Figure 1A:
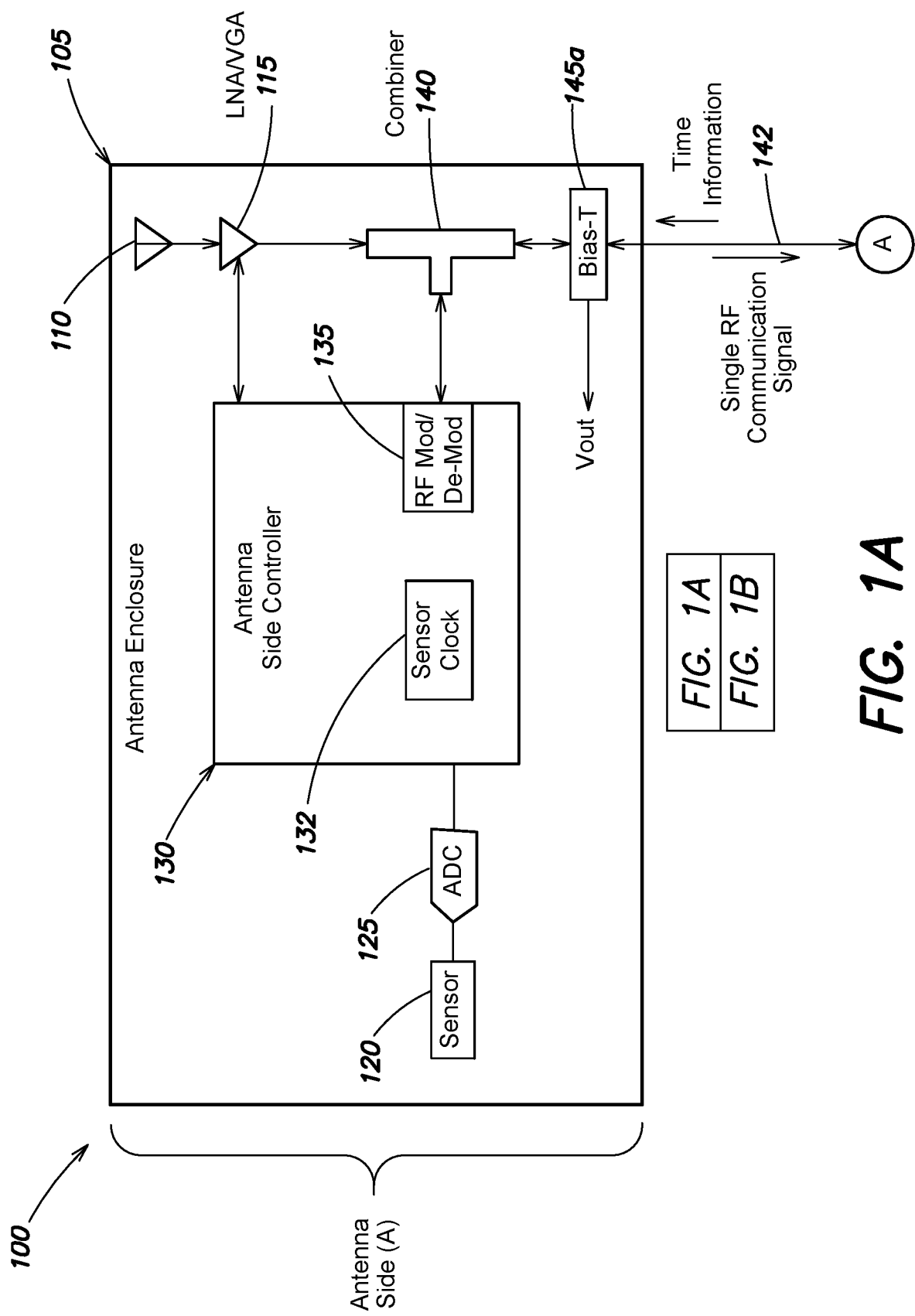
FIGS. 1A and 1B depict a system in accordance with an illustrative embodiment of the invention.
Figure 1B:
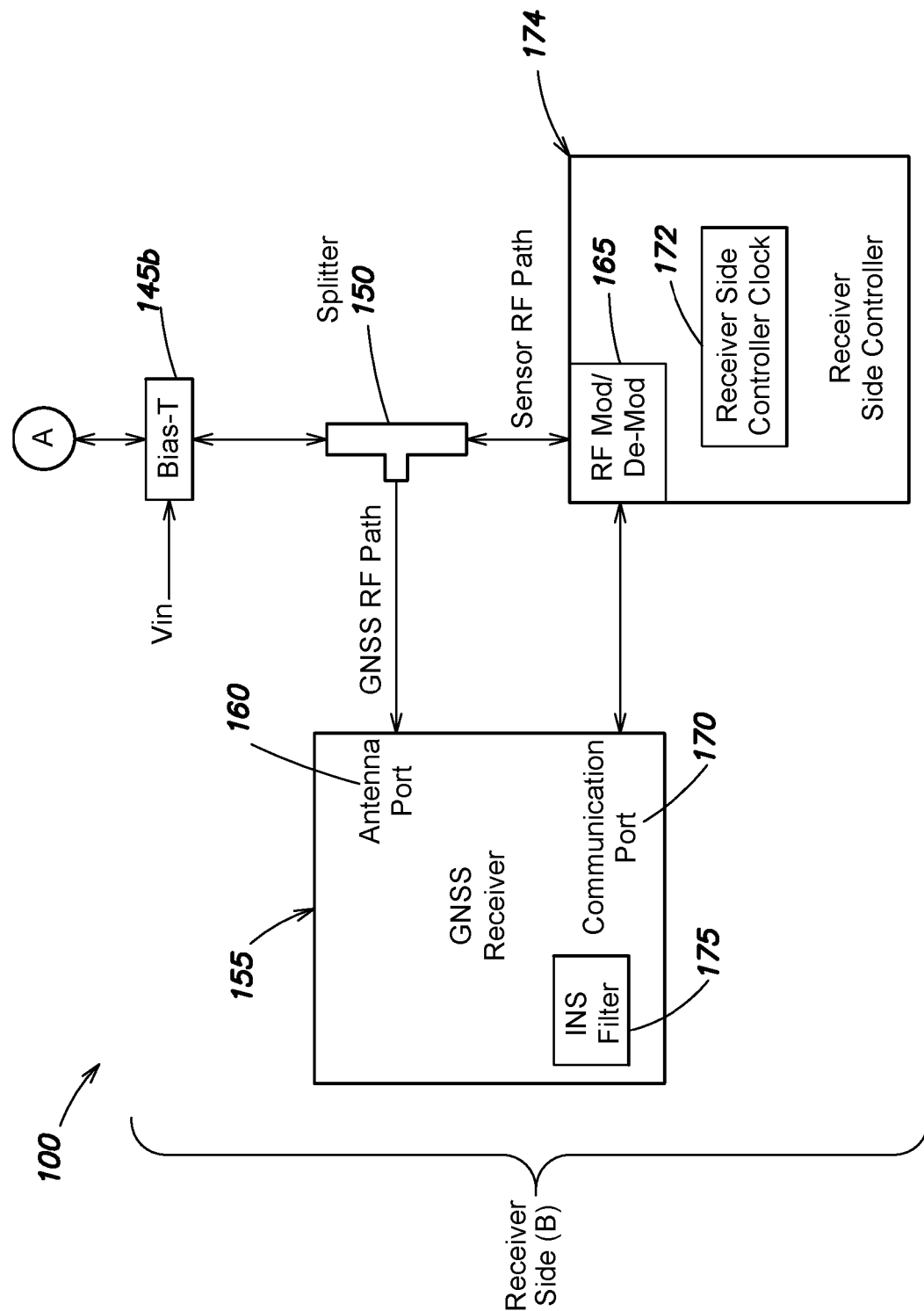

Referring to FIGS. 1A and 1B, a system 100, e.g., a Global Navigation Satellite System (GNSS)/Inertial Navigation System (INS) system, includes an antenna side (A) and a receiver side (B). The antenna side (A) of the system 100 includes an antenna enclosure 105. The antenna enclosure 105 includes a GNSS antenna 110 configured to receive one or more GNSS signals from one or more GNSS satellites, wherein the one or more GNSS signals contain GNSS information. For example, the one or more GNSS signals may utilize one or more different radio frequencies (RFs) associated with different bands, such as, but not limited to, L1, L2, and L5 bands (e.g., 1176-1610 MHz). A low noise amplifier (LNA)/variable gain amplifier (VGA) 115 may be utilized to modify the one or more GNSS signals (e.g., amplify and/or adjust the gains), as known by those skilled in the art.

In addition, the antenna enclosure 105 includes a sensor 120 that is mounted at a particular fixed position within the antenna enclosure 105 and configured to produce sensor data. For example, the sensor may be an inertial measurement unit (IMU) sensor, such as, but not limited to an accelerometer, a gyroscope, or a magnetometer. Alternatively, the sensor may be a ranging radio, a pressure sensor (e.g., barometer), a camera, a Light Detection and Ranging (LIDAR) sensor, or any other type of sensor. The 3-dimensional vector between the sensor 120 and the GNSS antenna 110 is known as a "lever arm," and the lengths of the vector in the x, y, and z dimensions are referred to as "lever arm values." The lever arm values may be determined and provided to a GNSS receiver 155 utilizing a graphical user interface or any of a variety of different mechanisms/techniques, as known by those skilled in the art.

In an embodiment, and when the sensor data produced by the sensor 120 is in an analog format, an analog-to-digital converter (ADC) 125, within the antenna enclosure 105, may convert the sensor data to a digital format. An antenna side controller 130, within the antenna enclosure 105, receives the digital sensor data. For example, the antenna side controller 130 receives the digital sensor data from the sensor 120 when the sensor 120 produces the sensor data in a digital format or receives the digital sensor data from the analog-to-digital converter 125 when analog sensor data is converted to the digital format.

The antenna side controller 130 includes at least a sensor clock 132 and an RF modulator/de-modulator 135. The sensor clock 132 of the antenna side controller 130 may be synchronized with GNSS time, as described in further detail below. In addition, the antenna side controller 130 may utilize the sensor clock 132 to time-tag the sensor data. The RF modulator/de-modulator 135 modulates the sensor data, which may or may not be time-tagged, onto a RF communication signal to produce a sensor RF communication signal that utilizes a RF frequency that is different than the RF frequency utilized by the one or more GNSS signals (e.g., 1176-1610 MHz). For example, the RF modulator/de-modulator 130 may modulate the digital sensor data utilizing a frequency associated with the industrial, scientific, and medical radio band (ISM band) (e.g., 915 MHz) to produce the sensor RF communication signal. As such, the sensor RF communication signal containing the sensor data is out-of-band from the one or more GNSS signals containing the GNSS information.

A combiner 140, within the antenna enclosure 105, receives the one or more GNSS signals containing the GNSS information from the LNA/VGA 115 and also receives the sensor RF communication signal containing the sensor data from the antenna side controller 130. The combiner 140 combines the one or more GNSS signals containing the GNSS information (in band) with the sensor RF communication signal containing the sensor data (out-of-band) to produce a single RF communication signal.

The single RF communication signal, containing the GNSS information and the sensor data, travels through a bias-T 145a and over the GNSS antenna data link 142 to the receiver side (B). For example, the GNSS antenna data link 142 may be a single coaxial cable. In addition, the GNSS antenna data link 142 may be unidirectional from the antenna enclosure 105 to the receiver side (B) or bi-directional. On the receiver side (B), the single RF communication signal travels through bias-T 145b to splitter 150 that splits the single RF communication signal into a GNSS RF path and a sensor RF path. It is noted that the two bias-Ts, 145a and 145b, are utilized to provide DC power ($V_{IN}$) to the components within the antenna enclosure 105 ($V_{OUT}$) while ensuring that the DC power does not pass through to the GNSS receiver 155, as known by those skilled in the art.

The GNSS RF path carries a GNSS split RF signal containing the GNSS information from the splitter 150 to the GNSS receiver 155 via an antenna port 160. The GNSS receiver 155 may utilize the GNSS information from the GNSS split RF signal to compute position, for example.

The sensor RF path carries a sensor split RF signal containing the sensor data from the splitter 150 to a receiver side controller 174. The receive side controller 174 includes a receiver side controller clock 172 and a RF modulator/de-modulator 165. The receiver side controller clock 172 may transmit time information to the antenna enclosure 105 to synchronize the sensor clock 132 with GNSS time, as will be described in further detail below. The RF modulator/de-modulator 165 of the receiver side controller 174 de-modulates the sensor data from the sensor split RF signal. The receiver side controller 174 may format the sensor data according to a protocol utilized to transmit the sensor data as packets to the GNSS receiver 155 via a communication port 170.

For example, if the communication port is a Universal Serial Bus (USB) port, the receiver side controller 174 may format the sensor data into one or more packets according to a protocol associated with the USB port. The GNSS receiver 155 may then utilize the sensor data. For example, an INS filter 175 (e.g., Kalman filter) of the GNSS receiver 155 may utilize the provided lever arm values, associated with the GNSS antenna 110 and the sensor 120 mounted in the same antenna enclosure, to integrate the sensor data with the GNSS information to accurately compute position, velocity, and/or attitude.

Advantageously, and since the sensor 120 and the GNSS antenna 110 are within the same antenna enclosure 105, movement of the antenna enclosure 105 does not cause the lever arm values to change. That is, the lever arm values remain constant since the positional relationship between the GNSS antenna 110 and the sensor 120 within the antenna enclosure 105 remains constant. Thus, the lever arm values associated with the GNSS antenna 110 and the sensor 120 only have to be calculated once. In addition, a loss in accuracy of the sensor data, due to IMU errors, is not magnified since the GNSS antenna 110 and the sensor 120 are in close proximity to each other within the antenna enclosure 105.

In an embodiment, and when the GNSS antenna data link 142 is bi-directional, the GNSS receiver 155 may transmit information (e.g., request information, configuration information, and/or time information) to the antenna enclosure 105 via the sensor RF path.

For example, time information may be transmitted to the antenna enclosure 105 such that the antenna side controller 130 can synchronize the sensor clock 132 with GNSS time. Specifically, the receiver side controller 174 may utilize time messages (e.g., variable frequency (VARF) signals) and pulse per second (PPS) signals received from the GNSS receiver 155 via the communication port 170 to synchronize the receiver side controller clock 172 with GNSS time, as known by those skilled in the art. The time information, associated with the synchronized receiver side controller clock 172, may be included in one or more acknowledgement messages that are then transmitted to the is antenna enclosure 105 utilizing the bi-directional GNSS antenna data link 142.

Specifically and in response to receiving the sensor data from the antenna enclosure 105, the receiver side controller 174 may record the received time (i.e., receiver-side timestamp) utilizing the synchronized receiver side controller clock 172 and send the one or more acknowledgment messages, with the receiver-side timestamp, to the antenna enclosure 105 via the sensor RF path confirming receipt of the sensor data. More specifically, the receiver-side timestamp (i.e., time information) and acknowledgment data may be modulated by the RF modulator/de-modulator 165 to produce one or more RF acknowledgment messages that are transmitted through the splitter 150 and bias-T 145b, and over the bi-directional GNSS antenna data link 142 to the antenna enclosure 105.

At the antenna enclosure 105, the RF acknowledgment messages are transmitted through the bias-T 145a and the combiner 140 to the antenna side controller 130. The RF modulator/de-modulator 135 de-modulates the time information and acknowledgment data from the RF acknowledgment messages. The antenna side controller 130 may then utilize the time information to synchronize the sensor clock 132 with the GNSS time. Advantageously, the now synchronized sensor clock 132 can be utilized by the antenna side controller 130 to accurately time-tag the sensor data.

In addition or alternatively, the GNSS receiver 155 may send one or more requests, via the sensor RF path and utilizing the bi-directional GNSS antenna data link 142, for the lever arm values, a status of the antenna 110, a model identifier of the antenna 110, a serial number of the antenna 110, and/or a phase center of the antenna 110, etc. For example and in response to receiving a request for the lever arms values is from the GNSS receiver 155 via the bi-directional GNSS antenna data link 142, the antenna enclosure 105 may provide the lever arm values to the GNSS receiver 155 as described above.

In addition or alternatively, the GNSS receiver 155 may send one or more configuration commands, via the sensor RF path and utilizing the bi-directional GNSS antenna data link 142, to instruct a device within the antenna enclosure 105 to perform one or more functions. For example, such configuration commands may include, but are not limited to, VGA adjustment, sensor RF signal gain adjustment, control sensor operation (e.g., filtering, sample rates, and/or measurement modes), and/or turning on/off particular antenna elements.

Specifically, the requests and/or configuration commands may be transmitted via communication port 170 to the receiver side controller 174. The RF modulator/de-modulator 165 may modulate the request information in the requests and/or the configuration information in the configuration commands to produce one or more RF request messages and/or one or more RF configuration messages. The one or more RF request messages and/or the one or more RF communication messages are transmitted through the splitter 150 and bias-T 145b, and over the bi-directional GNSS antenna data link 142 to the antenna enclosure 105.

At the antenna enclosure 105, the RF request messages and/or RF configuration messages are transmitted through the bias-T 145a and the combiner 140 to the antenna side controller 130. The RF modulator/de-modulator 135 demodulates the request information and/or configuration information from the RF request messages and/or RF configuration messages. The antenna side controller 130 may then utilize the request information to send particular information (e.g., lever arm values, a status of the antenna 110, a model identifier of the antenna 110, a serial number of the antenna 110, and/or a phase center of the antenna 110, etc.) to the GNSS receiver 155 via the sensor RF path and utilizing the bi-directional GNSS antenna data link 142, as described above. The particular information may then be utilized at the GNSS receiver 155 to integrate the sensor data and the GNSS information to produce accurate position, velocity, and/or attitude.

In addition or alternatively, the antenna side controller 130 may utilize the configuration information to perform one or more functions at the antenna side (A). For example, the antenna 110 may turn on or turn off particular antenna elements based on the configuration information.

Figure 2A:
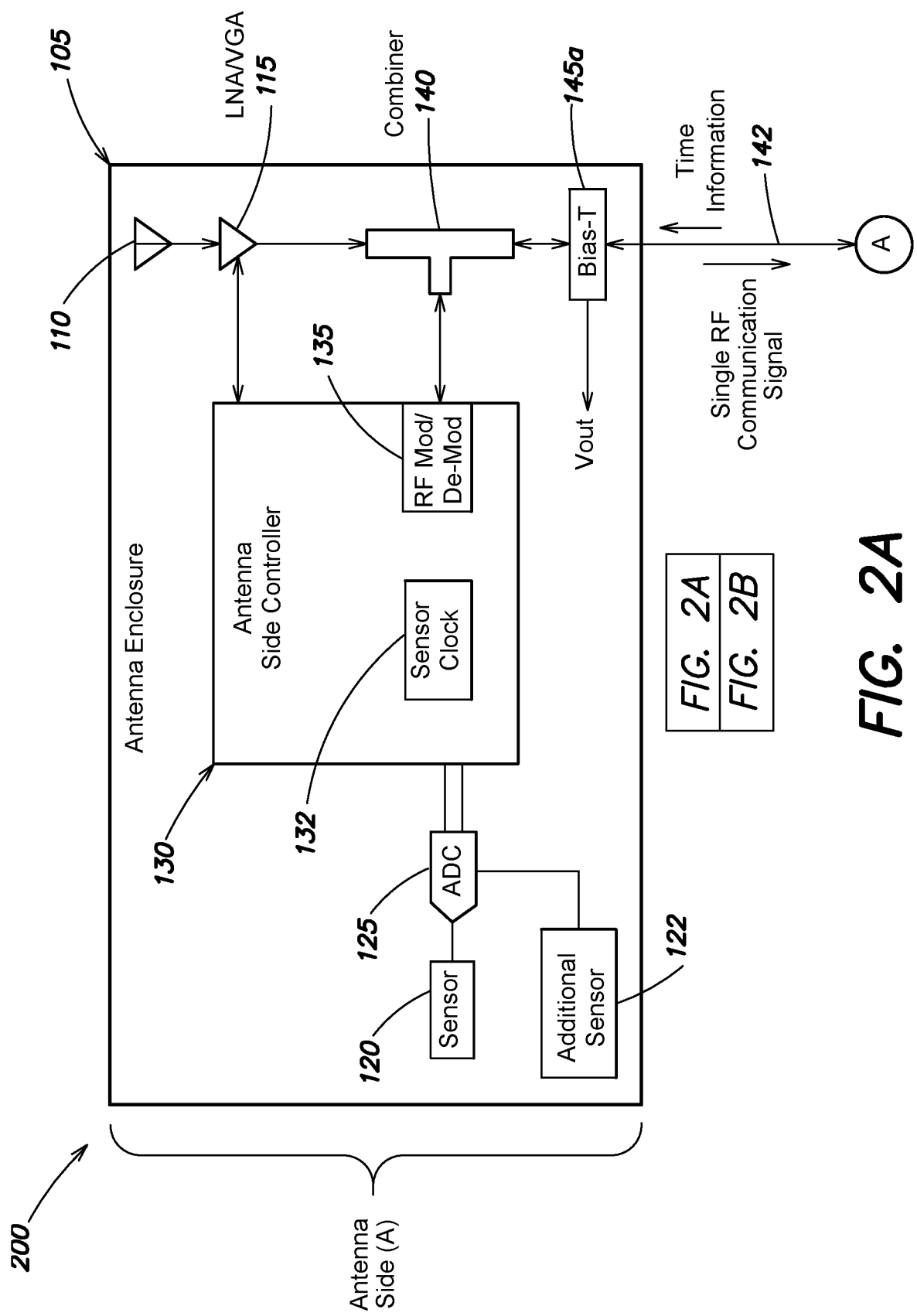
FIGS. 2A and 2B depict a system with a plurality of sensors in accordance with an illustrative embodiment of the invention.
Figure 2B:
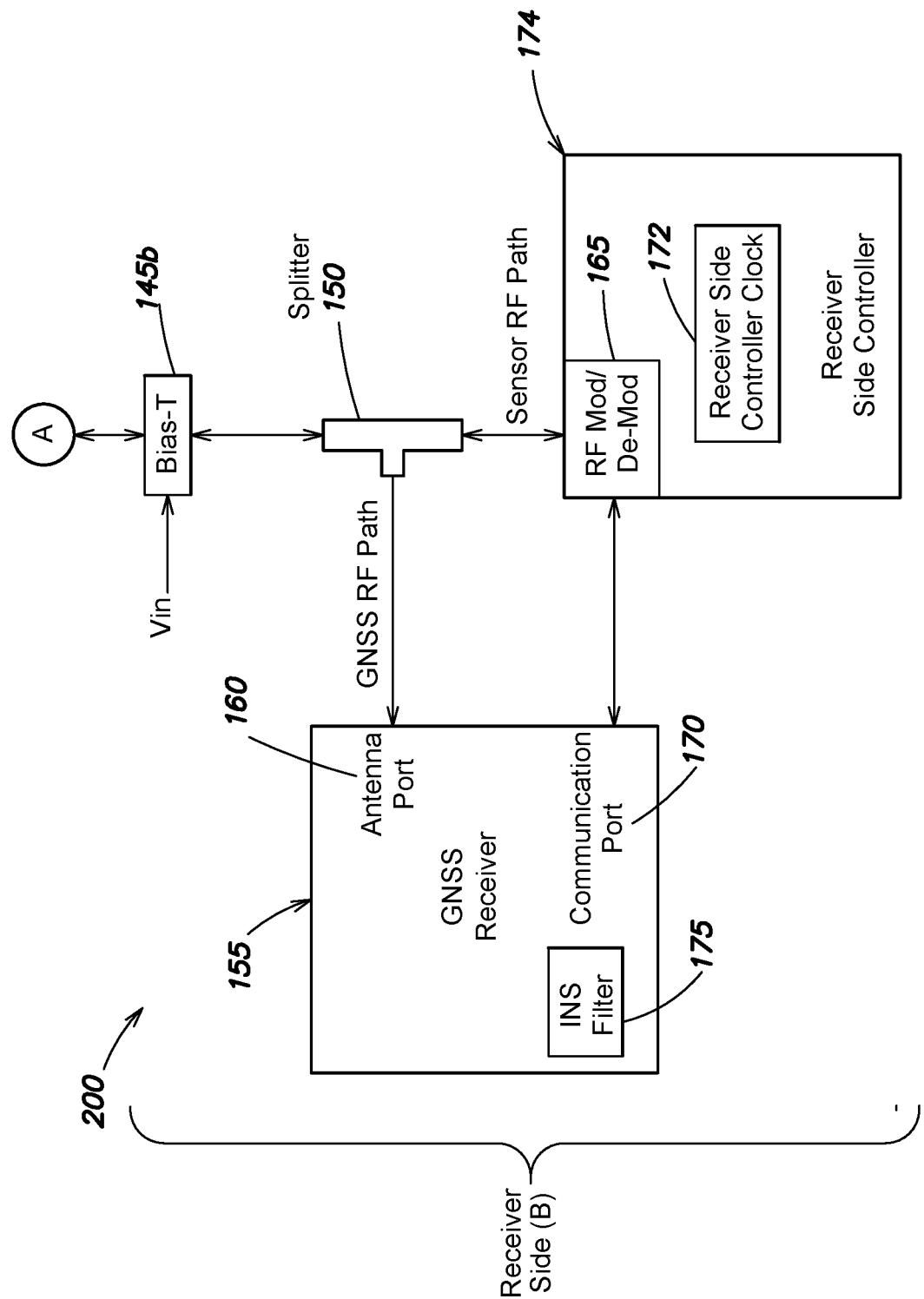

Referring to FIGS. 2A and 2B, a system 200, e.g., a GNSS/INS system, includes an antenna side (A) and a receiver side (B), wherein the antenna side (A) includes an antenna enclosure 105 with plurality of sensors. Specifically, the antenna enclosure 105 includes the Global Navigation Satellite System (GNSS) antenna 110 configured to receive one or more GNSS signals from one or more GNSS satellites.

In addition, the antenna enclosure 105 includes the sensor 120 that is mounted at the particular fixed position within the antenna enclosure 105 and configured to produce sensor data. Further, the antenna enclosure 105 includes an additional sensor 122 that is mounted at a different fixed position within the antenna enclosure 105 and configured to produce additional sensor data. For example, a user may desire to add the additional sensor 122 to the antenna enclosure 105 to expand the capability of the system 200. As such, the lever arm values associated with the additional sensor (e.g., the 3-dimensional vector between the additional sensor 122 and the GNSS antenna 110) may be determined and provided to the GNSS receiver 155 utilizing a graphical user interface or any of a variety of different mechanisms/techniques, as known by those skilled in the art.

To accommodate the additional sensor 122, the ADC 125 and RF modulator/de-modulator 135 may contain a plurality of inputs and/or outputs. Alternatively, an additional ADC (not shown) may be included in the antenna enclosure 105 and/or an additional RF modulator/de-modulator (not shown) may be included within the controller 130 to accommodate the additional sensor 122. As such, the additional sensor data from the additional sensor 122 can be converted to a digital format and modulated onto an additional RF communication signal to produce an additional sensor RF communication signal.

The combiner 140 may then combine the one or more GNSS signals containing the GNSS information, the sensor RF communication signal containing the sensor data, and the additional sensor RF communication signal containing the additional sensor data to produce the single RF communication signal. That is, the sensor RF communication signal and the additional RF communication signal are out-of-band from the GNSS signals. For example, the GNSS signals containing the GNSS information may utilize a RF frequency associated with the L1, L2, L5 bands (e.g., between 1176-1610 MHz). In addition, the sensor RF communication signal containing the sensor data and the additional sensor RF communication signal containing the addition sensor data may utilize a frequency associated with the ISM band (e.g., 915 MHz). Although reference is made to the sensor RF communication signal and the additional sensor RF communication signal utilizing the same frequency, it is expressly contemplated that the additional sensor RF communication signal may utilize a frequency that is separate and distinct from the sensor RF communication signal and the GNSS signals.

The single RF communication signal (containing the GNSS information, the sensor data, and the additional sensor data) is transmitted to the receiver side (B) utilizing the GNSS antenna data link 142. Specifically, the single RF communication signal (containing the GNSS information, the sensor data, and additional sensor data) is transmitted through bias-T 145a, over the GNSS antenna data link 142, through the bias-T 145b, and to the splitter 150. The splitter 150 then splits the single RF communication signal into the GNSS RF path and the sensor RF path.

The GNSS path and sensor RF path operate in the manner described above with reference to FIGS. 1A and 1B for the GNSS split RF signal and the sensor split RF signal. In addition, the sensor RF path carries an additional sensor split RF signal containing the additional sensor data from the splitter 150 to the receiver side controller 174. The RF modulator/de-modulator 165 of the receiver side controller 174 de-modulates the additional sensor data from the additional sensor split RF signal. The controller may format the additional sensor data according to a protocol utilized to transmit the additional sensor data as packets to the GNSS receiver 155 via the communication port 170.

Advantageously, and since the additional sensor 122 and the GNSS antenna 110 are within the same antenna enclosure 105, movement of the antenna enclosure 105 does not cause the lever arm values to change. That is, the lever arm values for the additional sensor 122 also remain constant since the positional relationship between the GNSS antenna 110 and the additional sensor 122 within the antenna enclosure 105 remains constant. In addition, a loss in accuracy of the additional sensor data, due to IMU errors, is not magnified since the GNSS antenna 110 and the additional sensor 122 are in close proximity to each other within the antenna enclosure 105.

It is noted that the sensor clock 132, which may be synchronized as described above, can be used for the additional sensor 122 and the additional sensor data may be accurately time-tagged utilizing the synchronized sensor clock 132.

Figure 3:
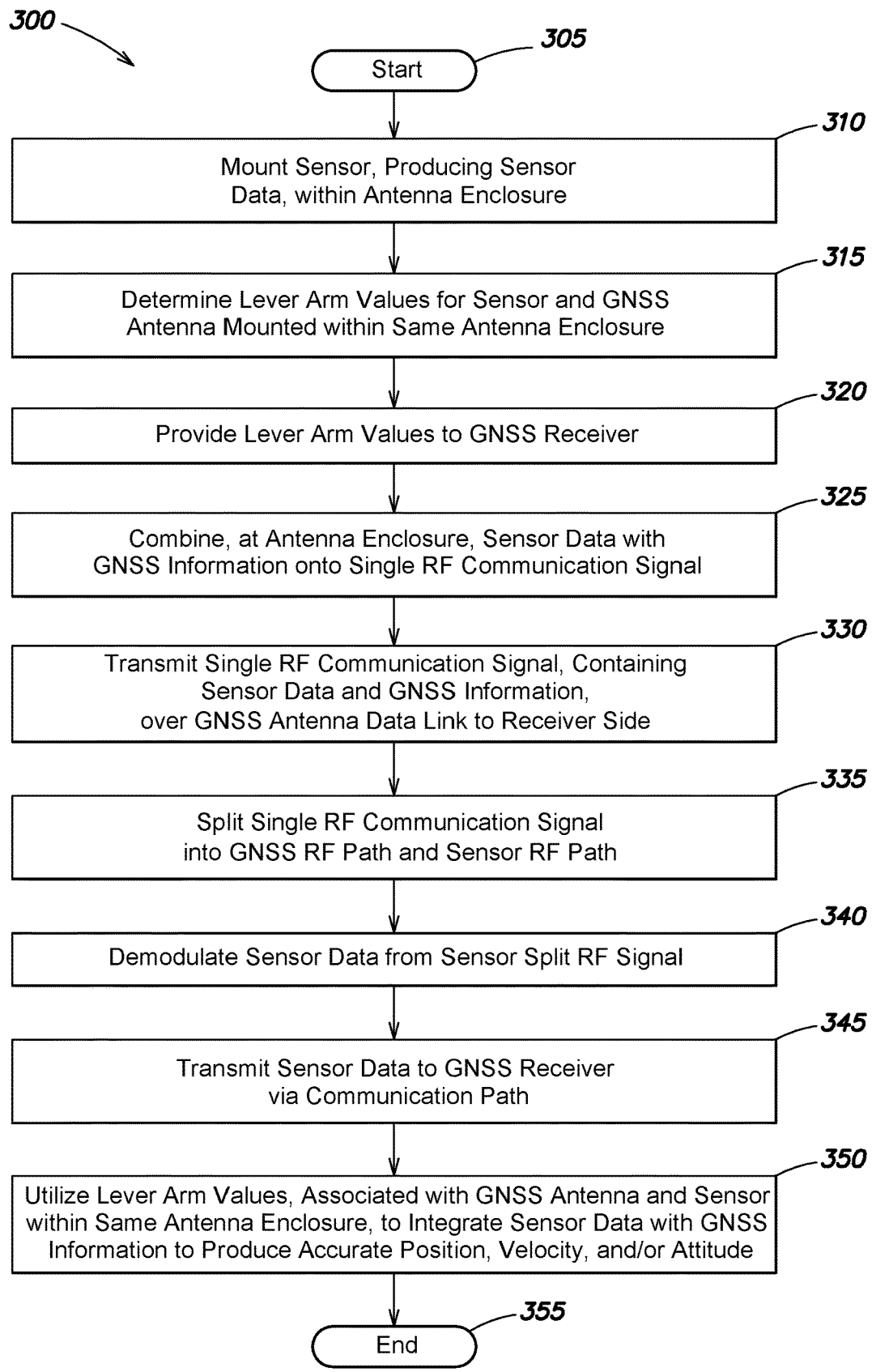
FIG. 3 is an exemplary flow chart for utilizing a single Global Navigation Satellite System (GNSS) antenna data link to transmit sensor data and GNSS information from an antenna enclosure to a GNSS receiver in accordance with an illustrative embodiment of the invention.

FIG. 3 is an exemplary flow chart for utilizing a GNSS antenna data link to transmit sensor data and GNSS information from an antenna enclosure to a GNSS receiver in accordance with an illustrative embodiment of the invention. The procedure 300 starts at step 305 and continues to step 310 where a sensor 120, that produces sensor data, is mounted within an antenna enclosure 105. For example, the sensor 120 may be an inertial measurement unit (IMU) sensor, such as, but not limited to an accelerometer, a gyroscope, or a magnetometer. Alternatively, the sensor may be a ranging radio, a pressure sensor (e.g., barometer), a camera, a LIDAR sensor, or any other type of sensor. In addition, the antenna enclosure 105 includes a GNSS antenna 110 configured to receive one or more GNSS signals that contain GNSS information. Further, the sensor data may be converted from an analog format to a digital format utilizing an ADC 125 and the sensor data may be time-tagged by the controller 130 utilizing the sensor clock 132 that was synchronized with GNSS time as described above.

The procedure continues to step 315 where the lever arm values are determined for the sensor and GNSS antenna mounted within the same antenna enclosure. Since the sensor 120 is mounted at a fixed position within the antenna enclosure 105, the lever arm values remain constant even if the antenna enclosure 105 is moved. In addition, a loss in accuracy of the sensor data, due to errors, is not magnified since the GNSS antenna 110 and sensor 120 are in close proximity to each other within the antenna enclosure 105.

The procedure continues to step 320 where the lever arm values are provided to the GNSS receiver. For example, a graphical user interface or any of variety of different mechanisms/techniques may be utilized to provide the lever arm values to the GNSS receiver 155.

The procedure continues to step 325 where the antenna enclosure combines the sensor data with the GNSS information onto a single RF communication signal, wherein the sensor data is out-of-band from the GNSS information. Specifically, the sensor data may be modulated onto a RF communication signal by the RF modulator/de-modulator 135 to produce a sensor RF communication signal. The sensor RF communication signal containing the sensor data may then be combined, utilizing the combiner 140, with the GNSS signals containing the GNSS information to produce the single RF communication signal, wherein the sensor RF communication signal is out-of-band-from the GNSS signals.

It is noted that if a plurality of sensors are utilized, a sensor RF communication signal for each sensor is combined with the GNSS signals to produce the single RF communication signal, wherein the GNSS signals utilize a different frequency than the sensor RF communication signals. For example if there are two sensors within the antenna enclosure, the GNSS signals containing the GNSS information may utilize a RF frequency associated with the L1, L2, L5 bands (e.g., between 1176-1610 MHz) and a sensor RF communication signal containing the sensor data and an additional sensor RF communication containing the additional sensor data may utilize a frequency associated with the ISM band (e.g., 915 MHz).

The procedure continues to step 330 where the single RF communication signal, containing the sensor data and the GNSS information, is transmitted over the GNSS antenna data link to the receiver side. For example, the GNSS antenna data link 142 may be a single coaxial cable. Specifically, the single RF communication signal is transmitted through the bias-T 145a, over the GNSS antenna data link 142, through the bias-T 145b, and to the splitter 150 on the receiver side (B). The procedure continues to step 335 where a splitter 150 on the receiver side splits the single RF communication signal into a GNSS RF path and a sensor RF path.

Specifically, the GNSS RF path carries a GNSS split RF signal containing the GNSS information from the splitter 150 to the antenna port 160 of the GNSS receiver 155 that may use the GNSS information in a known manner. For example, the GNSS receiver 155 may utilize the GNSS information to compute position. The sensor RF path carries a sensor split RF signal containing the sensor data from the splitter 150 to the receiver side controller 174.

The procedure continues to step 340 where the sensor data is demodulated from the sensor split RF signal. Specifically, the RF modulator/de-modulator 165 of the receiver side controller 174 demodulates the sensor data from the sensor split RF signal. The receiver side controller 174 may format the sensor data into one or more packets according to a protocol associated with a communication port 170 of the GNSS receiver 155.

The procedure continues to step 345 where the sensor data is transmitted to the GNSS receiver via the communication port. The procedure continues to step 350 and the lever arm values, associated with the GNSS antenna and the sensor mounted in the same antenna enclosure, are utilized to integrate the sensor data with the GNSS information to produce accurate position, velocity, and/or attitude. Specifically, the INS filter 175 of the GNSS receiver 155 may utilize the lever arm values, associated with the GNSS antenna 110 and the sensor 120 mounted in the same antenna enclosure 105, to integrate the sensor data with the GNSS information to to produce accurate position, velocity, and/or attitude.

Advantageously, and since the sensor 120 and the GNSS antenna 110 are within the same antenna enclosure 105, movement of the antenna enclosure 105 does not cause the lever arm values to change. That is, the lever arm values remain constant since the positional relationship between the GNSS antenna 110 and the sensor 120 within the antenna enclosure 105 remains constant. In addition, a loss in accuracy of the sensor data, due to IMU errors, is not magnified since the GNSS antenna 110 and the sensor 120 are in close proximity to each other within the antenna enclosure 105. The procedure ends at step 355.

Figure 4:
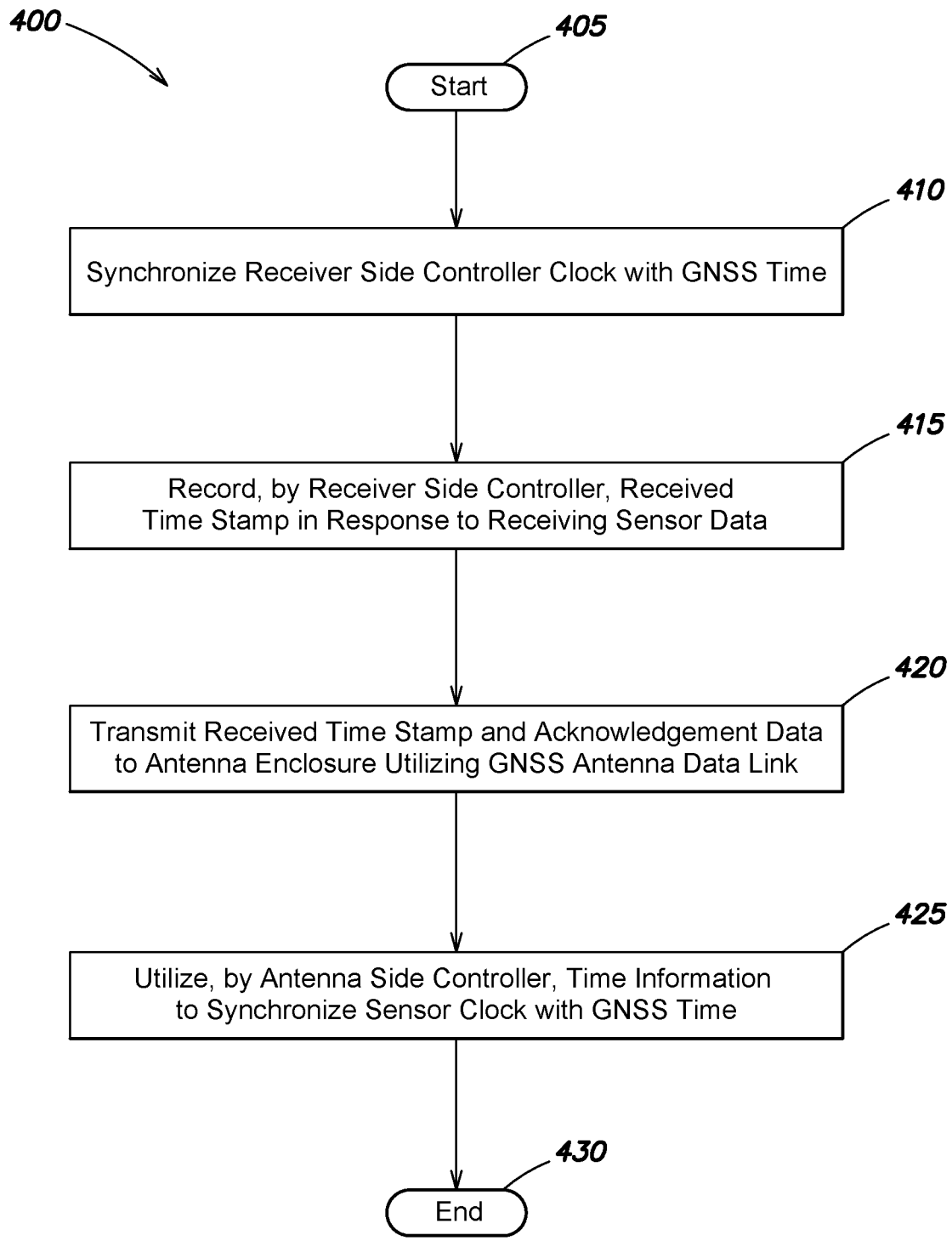
FIG. 4 is an exemplary flow chart for transmitting time information from the GNSS receiver to the antenna enclosure when the GNSS antenna data link is bi-directional in accordance with an illustrative embodiment of the invention.

FIG. 4 is an exemplary flow chart for transmitting time information from the GNSS receiver to the antenna enclosure when the GNSS antenna data link is bi-directional in accordance with an illustrative embodiment of the invention. The procedure 400 starts at step 405 and continues to step 410 where the receiver side controller synchronizes the receiver side controller clock with GNSS time. For example, the receiver side controller 174 may receive variable frequency (VARF) signals and pulse per second (PPS) signals from the GNSS receiver 155 via the communication port 170. The VARF signal (e.g., a 5 MHz VARF signal) may then be utilized to steer the receiver side controller clock 172 to the GNSS time and the PPS signals may be utilized to subsequently synchronize the receiver side controller clock 172, as known by those skilled in the art.

The procedure continues to step 415 where the receiver side controller records a received time stamp, in response to receiving the sensor data from the antenna enclosure, utilizing the receiver side controller clock 172 synchronized with the GNSS time. The procedure continues to step 420 where the received time stamp (i.e., time information) and acknowledgment data are transmitted to the antenna enclosure utilizing the GNSS antenna data link 142. Specifically, the RF modulator/de-modulator 165 modulates the time information and acknowledgment data to produce one or more RF acknowledgment messages that are transmitted through the splitter 150 and bias-T 145b and over the bi-directional GNSS antenna data link 142 to the antenna enclosure 105.

The procedure continues to step 425 where the antenna side controller utilizes the time information to synchronize the sensor clock with GNSS time. Specifically and at the antenna enclosure 105, the RF acknowledgment messages are transmitted through the bias-T 145a and combiner 140 to the antenna side controller 130. The RF modulator/de-modulator 135 de-modulates the time information and acknowledgment data from the RF acknowledgment messages. The antenna side controller 130 may then utilize the time information to synchronize the sensor clock 132 with the GNSS time.

Advantageously, the now synchronized sensor clock 132 can be utilized by the antenna side controller 130 to accurately time-tag the sensor data. The procedure then ends at step 430.

Figure 5:
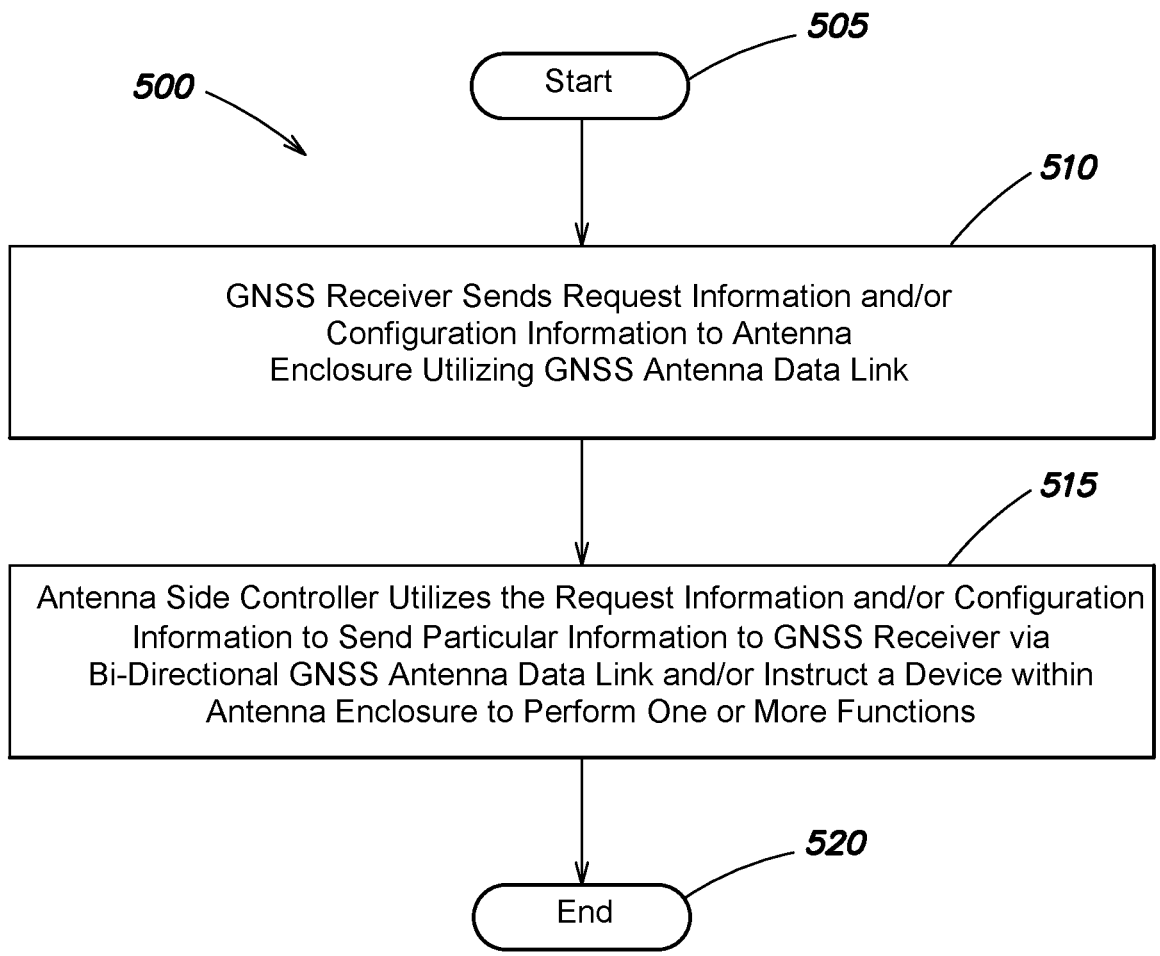
FIG. 5 is an exemplary flow chart for transmitting request information and/or configuration information from the GNSS receiver to the antenna enclosure when the GNSS antenna data link is bi-directional in accordance with an illustrative embodiment of the invention.

FIG. 5 is an exemplary flow chart for transmitting request information and/or configuration information from the GNSS receiver to the antenna enclosure when the GNSS antenna data link is bi-directional in accordance with an illustrative embodiment of the invention. The procedure 500 starts at step 505 and continues to step 510 where the GNSS receiver sends request information and/or configuration information to the antenna enclosure utilizing the bi-directional GNSS antenna data link.

Specifically, one or more requests may be for the lever arm values, a status of the antenna 110, a model identifier of the antenna 110, a serial number of the antenna 110, and/or a phase center of the antenna 110, etc. One or more configuration commands may instruct a device within the antenna enclosure 105 to perform one or more particular functions. For example, such configuration commands may include, but are not limited to, VGA adjustment, sensor RF signal gain adjustment, control sensor operation (e.g., filtering, sample rates, and/or measurement modes), and/or turning on/off particular antenna elements.

More specifically, the requests and/or configuration commands are transmitted from the GNSS receiver 155 to the receiver side controller 174 via the communication port 170. The RF modulator/de-modulator 165 modulates the request information in the requests and/or configuration information in the configuration commands to produce one or more RF request messages and/or one or more RF configuration messages. The one or more RF request messages and the one or more RF configuration messages are is transmitted via the sensor RF path through the splitter 150 and bias-T 145*b* over the bi-directional GNSS antenna data link 142 to the antenna enclosure 105.

The procedure continues to step 515 where the antenna side controller utilizes the request information and/or the configuration information to send particular information to the GNSS receiver via the bi-directional GNSS antenna data link and/or instruct a device within the antenna enclosure to perform one or more functions. Specifically and at the antenna enclosure 105, the RF request messages and/or RF configuration messages are transmitted through the bias-T 145*a* and combiner 140 to the antenna side controller 130. The RF modulator/de-modulator 135 demodulates the request information and/or configuration information from the RF request messages and/or RF configuration messages. The antenna side controller 130 may then utilize the request information and/or configuration information.

For example and based on the request information, the antenna side controller 130 may send the lever arm values, a status of the antenna 110, a model identifier of the antenna 110, a serial number of the antenna, and/or a phase center of the antenna 110, etc., via the bi-directional GNSS antenna data link 142. Specifically, and in response to receiving a request for the lever arms values from the GNSS receiver 155 via the bi-directional GNSS antenna data link 142, the antenna enclosure 105 may provide the lever arm values to the GNSS receiver 155 as described above with reference to FIG. 3.

The particular information may then be utilized by the GNSS receiver 155 to integrate the sensor data and the GNSS information to produce accurate position, velocity, and/or attitude.

In addition or alternatively, and based on the configuration information, the is antenna side controller 130 may cause a device within the antenna enclosure 105 to perform a particular function. For example, the antenna side controller 130 may cause the antenna 110 to turn on or turn off particular antenna elements. The procedure then ends at step 520.

The foregoing description described certain example embodiments. It will be apparent, however, that other variations and modifications may be made to the described embodiments, with the attainment of some or all of their advantages. For example, although FIG. 2A include two sensors 120 and 122, it is expressly contemplated that any number of sensors may be utilized such that the sensor data from each of the sensors is combined with the GNSS information from the GNSS signals to produce a single RF communication signal that is transmitted over the GNSS antenna data link to the receiver side. In addition, although FIGS. 1A and 2A depict the antenna side controller and the receiver side respectively including a RF modulator/demodulator, it is expressly contemplated that the RF modulator/demodulator may be separate components from the antenna side controller and the receiver side controller. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system comprising:
an antenna enclosure configured to house at least
a Global Navigation Satellite System (GNSS) antenna configured to receive one or more GNSS signals containing GNSS information,
a sensor configured to produce sensor data, and
a combiner configured to combine the sensor data and the GNSS information onto a single radio frequency (RF) communication signal, wherein the sensor data is out-of-band from the GNSS information;
a GNSS antenna data link between the antenna enclosure and a receiver side, the GNSS antenna data link configured to transmit the single RF communication signal, containing the sensor data and the GNSS information, to the receiver side;
a splitter, of the receiver side, being external to a receiver side controller and a GNSS receiver, the splitter configured to receive, via the GNSS antenna data link, the single RF communication signal and further configure to split the RF communication signal into a GNSS split RF signal containing the GNSS information and a sensor split RF signal containing the sensor data;
the receiver side controller, of the receiver side, being external to the GNSS receiver, the receiver side controller configured to demodulate the sensor data from the sensor split RF signal;
an antenna port of the GNSS receiver configured to receive the GNSS split RF signal containing the GNSS information from the splitter; and
a communication port of the GNSS receiver configured to receive the sensor data from the receiver side controller.

2. The system of claim 1, wherein the antenna enclosure is further configured to house an analog to digital converter configured to convert the sensor data from an analog format to a digital format.

3. The system of claim 1, wherein the antenna enclosure is further configured to house an antenna side controller including an RF modulator configured to create a sensor RF communication signal containing the sensor data, and wherein the combiner is further configured to combine the sensor RF communication signal containing the sensor data with the GNSS signals containing the GNSS information to produce the single RF communication signal, wherein the sensor RF communication signal is out-of-band-from the GNSS signals.

4. The system of claim 1, wherein the receiver side controller is further configured to format the sensor data according to a protocol of the communication port at the GNSS receiver at the receiver side.

5. The system of claim 1, wherein the receiver side controller is further configured to, in response to receiving the sensor split RF signal, transmit an acknowledgment message that includes a GNSS time to the antenna enclosure via the GNSS antenna data link.

6. The system of 5, wherein the antenna enclosure is further configured to house an antenna side controller configured to utilize the GNSS time to:
synchronize a sensor clock associated with the sensor to the GNSS time included in the acknowledgement message, and
time-tag the sensor data utilizing the synchronized sensor clock.

7. The system of 1, wherein the sensor is one of an inertial measurement unit (IMU) sensor, a ranging radio, a pressure sensor, a camera, and a Light Detection and Ranging (LIDAR) sensor.

8. A method, comprising:
mounting a sensor producing sensor data at a fixed position within an antenna enclosure, wherein the antenna enclosure houses at least a Global Navigation Satellite System (GNSS) antenna receiving one or more GNSS signals containing GNSS information;
combining, within the antenna enclosure, the sensor data and the GNSS information onto a single radio frequency (RF) communication signal, wherein the sensor data is out-of-band from the GNSS information;
transmitting, over a single GNSS antenna data link between the antenna enclosure and a receiver side, the single RF communication signal to the receiver side;
splitting, by a receiver side splitter that is external to a receiver side controller and a GNSS receiver, the single RF communication signal received via the single GNSS antenna data link into a GNSS split RF signal containing the GNSS information and a sensor split RF signal containing the sensor data;
de-modulating, by the receiver side controller that is external to the GNSS receiver, the sensor data from the sensor split RF signal;
receiving, at an antenna port of the GNSS receiver, the GNSS split RF signal containing the GNSS information from the receiver side splitter; and
receiving, at a communication port of the GNSS receiver, the sensor data from the receiving side controller.

9. The method of claim 8, further comprising converting, within the antenna enclosure, the sensor data from analog format to a digital format.

10. The method of claim 8, further comprising:
modulating, within the antenna enclosure, the sensor data onto a sensor RF communication signal; and
combining, within the antenna enclosure, the sensor RF communication signal containing the sensor data with the GNSS signals containing the GNSS information to produce the single RF communication signal, wherein the sensor RF communication signal is out-of-band from the GNSS signals.

11. The method of claim 8, further comprising formatting the sensor data, de-modulated from the sensor split RF signal, according to a protocol of a communication port at the GNSS receiver on the receiver side.

12. The method of claim 8, further comprising
including GNSS time information and acknowledgment data within an acknowledgment message in response to the receiver side controller receiving the sensor data;
transmitting the acknowledgment message, that includes the GNSS time information and acknowledgment data, from the receiver side controller to an antenna side controller within the antenna enclosure via the single GNSS antenna data link.

13. The method of claim 12, further comprising utilizing, by the antenna side controller, the GNSS time to:
synchronize a sensor clock associated with the sensor to GNSS time utilizing the GNSS time information, and
time-tag the sensor data utilizing the synchronized clock.

14. The method of claim 8, further comprising:
mounting, within the antenna enclosure, an additional sensor producing additional sensor data;
combining, within the antenna enclosure, the sensor data, the GNSS information, and the additional sensor data onto the single RF communication signal,
wherein the sensor data and additional sensor data are out-of-band from the GNSS information.

15. A system comprising:
an antenna enclosure configured to house at least
a Global navigation satellite system (GNSS) antenna configured to receive one or more GNSS signals containing GNSS information,
a sensor configured to produce sensor data, and
a combiner configured to combine a sensor radio frequency (RF) communication signal containing the sensor data with the GNSS signals containing the GNSS information to produce a single RF communication signal, wherein the sensor RF communication signal is out-of-band from the GNSS signals; and
a GNSS antenna data link between the antenna enclosure and a receiver side, the GNSS antenna link configured to
transmit the single RF communication signal, containing the sensor data and the GNSS information, to the receiver side,
a splitter of the receiver side configured to receive, via the GNSS antenna data link, the single RF communication signal and further configure to split the RF communication signal into a GNSS split RF signal containing the GNSS information and a sensor split RF signal containing the sensor data; and
a receiver side controller, of the receiver side, configured to:
include a GNSS time and acknowledgment data into an acknowledgment message in response to the receiver side controller receiving the sensor data from the splitter, and
transmit, to the antenna enclosure via the GNSS antenna data link, the acknowledgment message that includes the GNSS time and the acknowledgment data.

16. The system of claim 15, wherein the antenna enclosure is further configured to house an antenna side controller configured to utilize the GNSS time to:
synchronize a clock associated with sensor to the GNSS time, and
time-tag the sensor data utilizing the synchronized clock.

* * * * *